Patented May 4, 1943

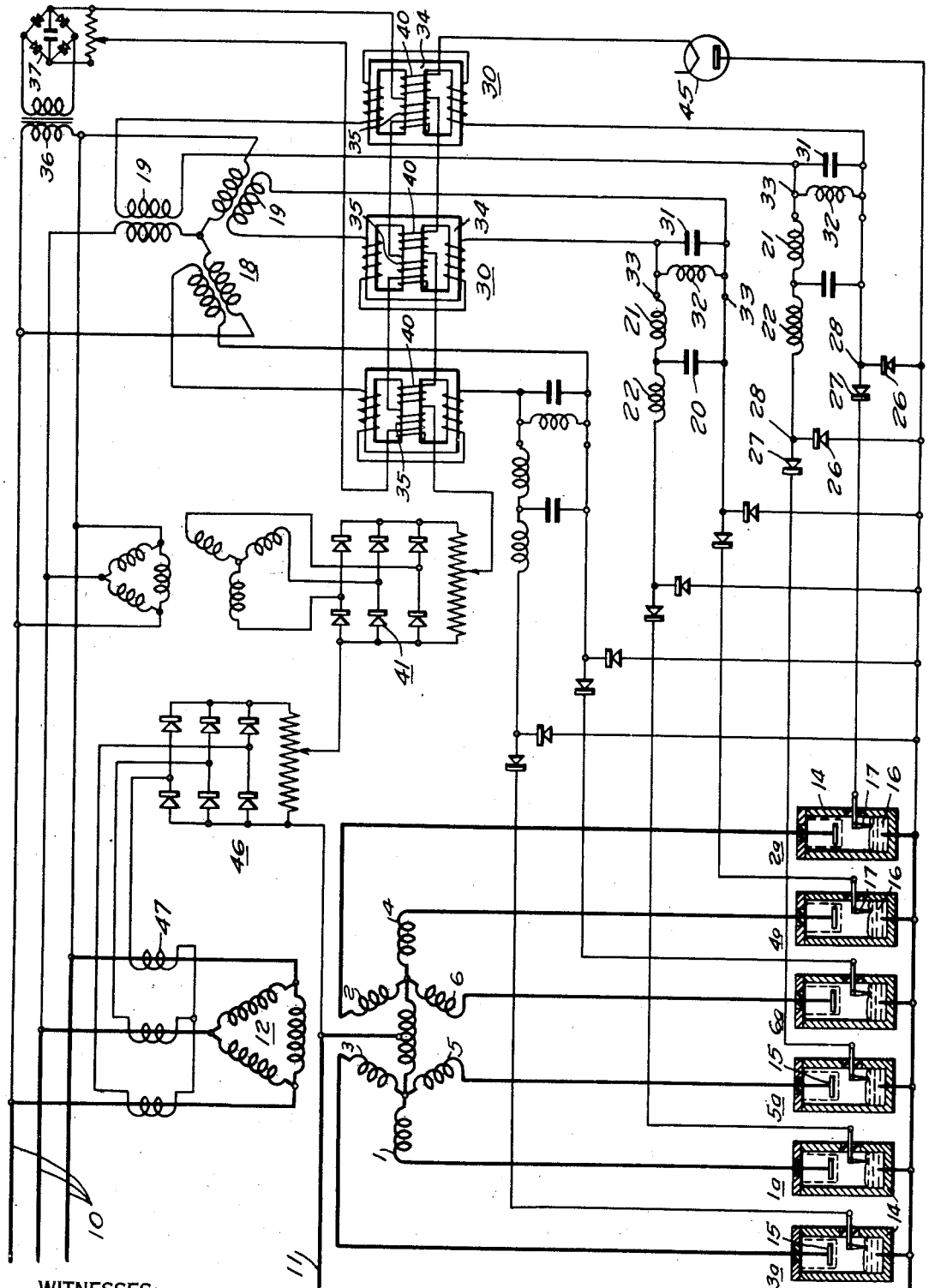

2,318,091

UNITED STATES PATENT OFFICE 2,318,091

VAPOR-ELECTRIC DEVICE

Henry C. Myers, Irwin, Pa., assignor to Westinghouse Electric & Manufacturing Company, East Pittsburgh, Pa., a corporation of Pennsylvania Application August 5, 1941, Serial No. 405,480

6 Claims. (Cl. 175—363)

My invention relates to a vapor-electric device and particularly to a control system for regulating the voltage of a make-alive-type converter.

In the use of make-alive-type converters, it is desirable to provide periodic make-alive impulses for controlling the conductivity of the individual make-alive valves.

It has recently been proposed to utilize wave-distorter-circuits or so-called reactor firing systems for applying these periodic make-alive impulses. Heretofore, no practical system has been provided for controlling the regulation of an impulsing system using the wave-distorter-circuits.

According to my invention, I provide an auxiliary phase shifting device of the variable reactance type and provide a variable reactor in the form of a saturable reactor having an auxiliary winding to vary the reactance.

In order to provide the necessary control current I prefer to balance the output potential of the converter against a suitable fixed bias and to control the current in the auxiliary winding by the difference between the output potential of the converter and the fixed bias. Further regulating or compounding effect may be secured by introducing a small auxiliary bias proportional to the load on the converter. By this means, any desired regulating characteristic for the converter can be obtained.

It is, therefore, an object of my invention to provide a voltage regulating system for a make-alive-type converter.

It is a further object of my invention to provide a voltage regulating system responsive to the terminal potential of the make-alive-type converter.

It is a further object of my invention to provide a regulating system for providing any desired load characteristic on a vapor-electric converter.

Other objects and advantages of my invention will be apparent from the following detailed description taken in conjunction with the accompanying drawing, in which the single figure is a schematic illustration of a conversion system according to my invention.

In the illustrated embodiment of my invention, an alternating current circuit such as a polyphase circuit 10 is connected to a direct current circuit 11 by means of a suitable rectifier transformer 12 herein illustrated as of the double three-phase type having phase terminals 1 to 6. This type of transformer provides a plurality of diametrically opposed phase terminals such as phases 1 and 4; 3 and 6; 2 and 5. Each of the phase terminals is connected to a make-alive-type valve comprising a main anode 15 and cathode 16 within an evacuated container 14 and having the make-alive electrode 17 in contact with the cathode 16 during normal operation of the converter.

The make-alive electrode 17 are excited in pairs by means of suitable impulse generators herein shown as wave distorter circuits supplied from any suitable source, such as the auxiliary transformer 18, the usual sine wave output of the auxiliary transformer 18 being distorted by means of the wave distorter circuit embodying a capacitor 20 energized from the electrically insulated secondary phase windings 19 of the auxiliary transformer 18 through a suitable impedance 21 and discharging to the make-alive electrodes 17 through a suitable non-linear inductance preferably in the form of a saturable reactor 22. In order to conserve energy, the inverse potential is by-passed around one of the pair of make-alive electrodes 17 by means of a series shunt rectifier arrangement 26—27. Preferably the series shunt rectifier arrangement comprises at least two rectifier elements 26—27 connected in conductive relation from the common cathode 16 of each of the valves to each of the terminals of the make-alive electrodes 17 and having the wave distorter circuit connection 28 made intermediate of the rectifier elements 26—27.

In order to adjust the phase relationship of the impulses produced by the wave distorter circuit, I prefer to provide a phase shifting network between the secondary windings 19 of the auxiliary transformer 18 and the wave distorter circuit. Each phase shifting network comprises a variable inductance preferably in the form of a saturable reactor 30 connected in series with the output of one of the secondary windings 19 of the auxiliary transformer 18 and a capacitor 31 and a reactor 32 preferably of the saturable type connected in shunt with the secondary winding 19 and said saturable reactor 30, the output potential of this phase shifting network being connected to the terminals 33 of a wave distorter circuit. Each of the series saturable reactors 30 of the phase shifting networks is preferably provided with a three-legged core 34 having a biasing winding 35 placed on one of the legs and energized from any suitable source of variable direct current such as through auxiliary transformer 36 and rectifying device 37 for producing a biasing potential for premagnetizing or predetermining the reactance of the series reactors 30 in order to determine the zero setting or commutation point in the make-alive-type valves.

In order to secure regulation of the terminal potentials of the make-alive devices, I have provided an auxiliary winding 40 on each of the phase shifting reactors 30 and connected these auxiliary windings 40 in series across the output terminals of the vapor-electric device and provided a direct current biasing potential from any suitable source such as the rectifier 41 energized from the main alternating current circuit 10. The biasing potential provided by rectifier 41 is of the order of magnitude of the desired no-load terminal voltage of the rectifier system and preferably is of slightly less magnitude by the amount of the voltage drop in a control tube 45 preferably of the gaseous type inserted in series with the auxiliary windings 40.

In the operation of my system, when the terminal potential of the vapor-electric system exceeds the biasing potential by a sufficient amount to break down the control tube 45, current will flow on the auxiliary saturating windings 40 changing the reactance of the phase shifting reactors 30 and retard the firing angle or commutation point in the vapor-electric valves to reduce the terminal potential of the converter.

In order to secure load responsive regulation, I have provided an auxiliary source 46 of direct current energized from a load responsive source such as the current transformer 47 associated with the connections between the transformer 12 and the alternating current circuit 10. The auxiliary biasing potential of source 46 is very small compared to the main biasing potential of source 41 and is preferably of the order of magnitude of the regulation desired in the converter.

In the illustrated embodiment, I have shown this auxiliary bias as connected in additive relation to the potential of the constant bias so that as the load on the converter increases, the bias potential will increase thus reducing the current in the auxiliary windings 40 of the phase shifting reactors and thus advance the firing angle or commutation point in the make-alive valves to produce a substantially constant regulating characteristic for the conversion system. Obviously the regulation characteristic can be changed at will by changing the magnitude or polarity of the load responsive potential.

While for purposes of illustration I have shown and described a specific embodiment of my invention, it will be apparent that changes and modifications can be made therein without departing from the true spirit of my invention or the scope of the appended claims.

I claim as my invention:

1. An electric current conversion system for interconnecting a plurality of electric circuits at least one of which is an alternating current circuit comprising at least a pair of main valves, a make-alive electrode in each of said main valves, output terminals for said system, an impulsing circuit for applying control impulses to said make-alive electrodes, a source of alternating potential for supplying energy to said impulsing circuit, a phase-shifting network interposed between said source and said impulsing circuit, said phase-shifting network including a saturable reactor, a saturating winding on said reactor, a source of biasing potential of the order of magnitude of the normal output potential of said converter, circuit means for connecting said bias source of biasing potential and said saturating winding in series across the output terminal of said conversion system and an auxiliary valve for passing current through said saturating winding when the potential of said output terminal exceeds said biasing potential.

2. An electric current conversion system for interconnecting a plurality of electric circuits at least one of which is an alternating current circuit comprising at least a pair of main valves, a make-alive electrode in each of said main valves, output terminals for said system, an impulsing circuit for applying control impulses to said make-alive electrodes, a source of alternating potential for supplying energy to said impulsing circuit, a phase-shifting network interposed between said source and said impulsing circuit, said phase-shifting network including a saturable reactor, a saturating winding on said reactor, a source of biasing potential of the order of magnitude of the normal output potential of said converter, circuit means for connecting said bias source of biasing potential and said saturating winding in series across the output terminal of said conversion system and an auxiliary valve for passing current through said saturating winding when the potential of said output terminal exceeds said biasing potential, an auxiliary biasing potential proportional to the load on said converter and means for connecting said auxiliary biasing potential in series with said first mentioned biasing potential.

3. A vapor-electric conversion system for interconnecting two electric circuits at least one of which is a polyphase alternating current circuit comprising a main polyphase transformer providing a plurality of pairs of phase terminals, terminals of each pair being diametrically opposite, a valve of the make-alive type connected to each of said phase terminals, each of said valves including a make-alive electrode, a source of control-potential, auxiliary transformer means energized from said source of control potential, for providing a plurality of electrically insulated secondary phase-windings, a plurality of impulsing networks associated with the respective secondary phase-windings, each impulsing network including a capacitor and a first and a second impedance device, at least said second impedance device being a non-linear reactor, the capacitor being connected in shunt relation to its associated phase-winding, with the first impedance device connected in series-circuit relation therebetween, and means, including said second impedance device for connecting the opposite terminals of said capacitor to the make-alive electrodes of two valves which are connected to one of said pairs of phase terminals, a phase shifting network connected between each of said secondary phase windings and its associated impulsing network, said phase shifting network including a saturating reactor and a capacitor each connected in shunt with the secondary phase winding and a second saturating reactor connected in series relation therebetween, a saturating winding associated with said second saturating reactor, means for impressing a direct current on said saturating winding, a second saturating winding on said second saturating reactor, a source of direct current bias potential and circuit means including a unidirectional conductor for connecting said bias potential and said second saturating windings in series relation across the output terminals of said conversion system.

4. A vapor-electric conversion system for interconnecting two electric circuits at least one of which is a polyphase alternating current circuit comprising a main polyphase transformer providing a plurality of pairs of phase terminals, the terminals of each pair being diametrically opposite, a valve of the make-alive type connected to each of said phase terminals, each of said valves including a make-alive electrode, a source of control-potential, auxiliary transformer means energized from said source of control potential, for providing a plurality of electrically insulated secondary phase-windings, a plurality of impulsing networks associated with the respective secondary phase-windings, each impulsing network including a capacitor and a first and a second impedance device, at least said second impedance device being a non-linear reactor, the capacitor being connected in shunt relation to its associated phase-winding, with the first impedance device connected in series-circuit relation therebetween, and means, including said second impedance device for connecting the opposite terminals of said capacitor to the make-alive electrodes of two valves which are connected to one of said pairs of phase terminals, a phase shifting network connected between each of said secondary phase windings and its associated impulsing network, said phase shifting network including a saturating reactor and a capacitor each connected in shunt with the secondary phase winding and a second saturating reactor connected in series relation therebetween, a saturating winding associated with said second saturating reactor, means for impressing a direct current on said saturating winding, a second saturating winding on said second saturating reactor, a source of direct current bias potential and circuit means including a unidirectional conductor for connecting said bias potential and said second saturating windings in series relation across the output terminals of said conversion system, a current transformer energized by current flow through said converter system, means for rectifying the potential of said current transformer and means for connecting said rectified potential in series with said bias potential.

5. In an electric translating system having an alternating current circuit and a direct current circuit interconnected by a transformer and a plurality of make-alive type valves for controlling the flow of current between said circuits, a control system comprising a control electrode for each of said valves, a source of alternating control potential, impulsing networks for supplying periodic control impulses to said control electrodes from said source of control potential, phase shifting networks interposed between said source and said impulsing networks, a variable reactor in each of said phase shifting networks, a winding associated with each of said reactors, a source of biasing potential proportional to the current carried by said valves and circuit means for connecting said windings and said source of biasing potential in series across the direct current circuit.

6. In an electric translating system having an alternating current circuit and a direct current circuit interconnected by a transformer and a plurality of make-alive type valves for controlling the flow of current between said circuits, a control system comprising a control electrode for each of said valves, a source of alternating control potential, impulsing networks for supplying periodic control impulses to said control electrodes from said source of control potential, phase shifting networks interposed between said source and said impulsing networks, a variable reactor in each of said phase shifting networks, a winding associated with each of said reactors, a source of biasing potential proportional to the current carried by said valves, circuit means for connecting said windings and said source of biasing potential in series across the direct current circuit, and a unidirectional conductor in series with said windings.

HENRY C. MYERS.